United States Patent
Xia et al.

(10) Patent No.: US 8,594,017 B2
(45) Date of Patent: Nov. 26, 2013

(54) METHOD FOR INTERFERENCE RANDOMIZATION OF PHYSICAL UPLINK CONTROL CHANNEL

(75) Inventors: Shuqiang Xia, Shenzhen (CN); Chunli Liang, Shenzhen (CN); Bo Dai, Shenzhen (CN); Peng Hao, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 326 days.

(21) Appl. No.: 12/988,584

(22) PCT Filed: Dec. 5, 2008

(86) PCT No.: PCT/CN2008/073353
§ 371 (c)(1),
(2), (4) Date: Oct. 19, 2010

(87) PCT Pub. No.: WO2009/129681
PCT Pub. Date: Oct. 29, 2009

(65) Prior Publication Data
US 2011/0032926 A1    Feb. 10, 2011

(30) Foreign Application Priority Data
Apr. 22, 2008 (CN) .......................... 2008 1 0094545

(51) Int. Cl.
  *H04B 7/212* (2006.01)
(52) U.S. Cl.
  USPC ............ 370/328; 370/329; 370/337; 370/347
(58) Field of Classification Search
  USPC .................................. 370/328, 329, 337, 347
  See application file for complete search history.

(56) References Cited

U.S. PATENT DOCUMENTS

| | | | | |
|---|---|---|---|---|
| 7,929,415 | B2 * | 4/2011 | Kwak et al. | 370/208 |
| 8,036,166 | B2 * | 10/2011 | Tiirola et al. | 370/329 |
| 8,160,018 | B2 * | 4/2012 | Zhang et al. | 370/330 |
| 2008/0253336 | A1 * | 10/2008 | Parkvall et al. | 370/335 |
| 2009/0163365 | A1 * | 6/2009 | Bentlage et al. | 504/360 |
| 2010/0067461 | A1 * | 3/2010 | Kwak et al. | 370/329 |
| 2010/0110878 | A1 * | 5/2010 | Frederiksen et al. | 370/216 |
| 2010/0284692 | A1 * | 11/2010 | Szell et al. | 398/58 |
| 2012/0163365 | A1 * | 6/2012 | Papasakellariou et al. | 370/345 |
| 2012/0201120 | A1 * | 8/2012 | Zhang et al. | 370/203 |

FOREIGN PATENT DOCUMENTS

| | | |
|---|---|---|
| CN | 1774119 A | 5/2006 |
| CN | 1909533 A | 2/2007 |
| CN | 101296513 A | 10/2008 |
| KR | 20030055622 A | 7/2003 |
| WO | 2007148710 A1 | 12/2007 |
| WO | 2008/006088 | 1/2008 |

OTHER PUBLICATIONS

International Search Report for Application No. PCT/CN2008/073353, dated Mar. 19, 2009.

(Continued)

*Primary Examiner* — Andrew Lee
(74) *Attorney, Agent, or Firm* — Brooks Kushman P.C.

(57) ABSTRACT

A method for interference randomization of physical uplink control channel (PUCCH), which is used in long term evolution (LTE) system, when multiple terminals multiplex PUCCH to transmit uplink control signalings, the difference of index of control channel resource used by any two terminals in the first timeslot of PUCCH is different from the difference of index of control channel resource used by the two terminals in the second timeslot of PUCCH. The invention can realize interference randomization between UEs that multiplex the same PUCCH.

14 Claims, 13 Drawing Sheets

(56) References Cited

OTHER PUBLICATIONS

"Uplink Data-non-associated Control Signaling in E-UTRA", 3GPP TSG RAN WG1 Meeting #50bis, Shanghai, China, Oct. 8, 2007, pp. 1-7.

"Slot-Level UL ACK/NACK Cyclic Shift/Orthogonal Cover Remapping" 3GPP TSG RAN WG1 Meeting #51, Jeju, Korea, Nov. 5-9, 2007, pp. 1-6.

"Slot-based Cyclic Shift and Orthogonal Cover Re-mapping for UL ACK/NACK", 3GPP TSG-RAN WG1 Meeting #51bis, Sevilla, Spain, Jan. 14-18, 2008, pp. 1-5.

* cited by examiner

| CS | $\Delta_{shift}=1$ | Timeslot #1 | | | Timeslot #2 | | |
|---|---|---|---|---|---|---|---|
| | $\delta_{shift}=0$ | OC=0 | OC=1 | OC=2 | OC=0 | OC=1 | OC=2 |
| | 0 | CB1<0> | CB1<12> | CB1<24> | CB2<0> | CB2<12> | CB2<24> |
| | 1 | CB1<1> | CB1<13> | CB1<25> | CB2<1> | CB2<13> | CB2<25> |
| | 2 | CB1<2> | CB1<14> | CB1<26> | CB2<2> | CB2<14> | CB2<26> |
| | 3 | CB1<3> | CB1<15> | CB1<27> | CB2<3> | CB2<15> | CB2<27> |
| | 4 | CB1<4> | CB1<16> | CB1<28> | CB2<4> | CB2<16> | CB2<28> |
| | 5 | CB1<5> | CB1<17> | CB1<29> | CB2<5> | CB2<17> | CB2<29> |
| | 6 | CB1<6> | CB1<18> | CB1<30> | CB2<6> | CB2<18> | CB2<30> |
| | 7 | CB1<7> | CB1<19> | CB1<31> | CB2<7> | CB2<19> | CB2<31> |
| | 8 | CB1<8> | CB1<20> | CB1<32> | CB2<8> | CB2<20> | CB2<32> |
| | 9 | CB1<9> | CB1<21> | CB1<33> | CB2<9> | CB2<21> | CB2<33> |
| | 10 | CB1<10> | CB1<22> | CB1<34> | CB2<10> | CB2<22> | CB2<34> |
| | 11 | CB1<11> | CB1<23> | CB1<35> | CB2<11> | CB2<23> | CB2<35> |

| CS | $\Delta_{shift}=1$ | Timeslot #1 | | | Timeslot #2 | | |
|---|---|---|---|---|---|---|---|
| | $\delta_{shift}=0$ | OC=0 | OC=1 | OC=2 | OC=0 | OC=1 | OC=2 |
| | 0 | UE<0> | UE<12> | UE<24> | UE<24> | UE<28> | UE<32> |
| | 1 | UE<1> | UE<13> | UE<25> | UE<12> | UE<16> | UE<20> |
| | 2 | UE<2> | UE<14> | UE<26> | UE<0> | UE<4> | UE<8> |
| | 3 | UE<3> | UE<15> | UE<27> | UE<25> | UE<29> | UE<33> |
| | 4 | UE<4> | UE<16> | UE<28> | UE<13> | UE<17> | UE<21> |
| | 5 | UE<5> | UE<17> | UE<29> | UE<1> | UE<5> | UE<9> |
| | 6 | UE<6> | UE<18> | UE<30> | UE<26> | UE<30> | UE<34> |
| | 7 | UE<7> | UE<19> | UE<31> | UE<14> | UE<18> | UE<22> |
| | 8 | UE<8> | UE<20> | UE<32> | UE<2> | UE<6> | UE<10> |
| | 9 | UE<9> | UE<21> | UE<33> | UE<27> | UE<31> | UE<35> |
| | 10 | UE<10> | UE<22> | UE<34> | UE<15> | UE<19> | UE<23> |
| | 11 | UE<11> | UE<23> | UE<35> | UE<3> | UE<7> | UE<11> |

FIG. 4

| CS | $\Delta_{shift}=2$ | | Timeslot #1 | | | Timeslot #2 | | |
|---|---|---|---|---|---|---|---|---|
| | $\delta_{shift}=1$ | $\delta_{shift}=0$ | OC=0 | OC=1 | OC=2 | OC=0 | OC=1 | OC=2 |
| | 1 | 0 | CB1<0> | | CB1<12> | CB2<0> | | CB2<12> |
| | 2 | 1 | | CB1<6> | | | CB2<6> | |
| | 3 | 2 | CB1<1> | | CB1<13> | CB2<1> | | CB2<13> |
| | 4 | 3 | | CB1<7> | | | CB2<7> | |
| | 5 | 4 | CB1<2> | | CB1<14> | CB2<2> | | CB2<14> |
| | 6 | 5 | | CB1<8> | | | CB2<8> | |
| | 7 | 6 | CB1<3> | | CB1<15> | CB2<3> | | CB2<15> |
| | 8 | 7 | | CB1<9> | | | CB2<9> | |
| | 9 | 8 | CB1<4> | | CB1<16> | CB2<4> | | CB2<16> |
| | 10 | 9 | | CB1<10> | | | CB2<10> | |
| | 11 | 10 | CB1<5> | | CB1<17> | CB2<5> | | CB2<17> |
| | 0 | 11 | | CB1<11> | | | CB2<11> | |

| CS | $\Delta_{shift}=2$ | | Timeslot #1 | | | Timeslot #2 | | |
|---|---|---|---|---|---|---|---|---|
| | $\delta_{shift}=1$ | $\delta_{shift}=0$ | OC=0 | OC=1 | OC=2 | OC=0 | OC=1 | OC=2 |
| | 1 | 0 | UE<0> | | UE<12> | UE<12> | | UE<16> |
| | 2 | 1 | | UE<6> | | | UE<14> | |
| | 3 | 2 | UE<1> | | UE<13> | UE<6> | | UE<10> |
| | 4 | 3 | | UE<7> | | | UE<8> | |
| | 5 | 4 | UE<2> | | UE<14> | UE<0> | | UE<4> |
| | 6 | 5 | | UE<8> | | | UE<2> | |
| | 7 | 6 | UE<3> | | UE<15> | UE<13> | | UE<17> |
| | 8 | 7 | | UE<9> | | | UE<15> | |
| | 9 | 8 | UE<4> | | UE<16> | UE<7> | | UE<11> |
| | 10 | 9 | | UE<10> | | | UE<9> | |
| | 11 | 10 | UE<5> | | UE17> | UE<1> | | UE5> |
| | 0 | 11 | | UE<11> | | | UE<3> | |

FIG. 5

| CS | $\Delta_{shift}=3$ | | | Timeslot #1 | | | Timeslot #2 | | |
|---|---|---|---|---|---|---|---|---|---|
| | $\delta_{shift}=2$ | $\delta_{shift}=1$ | $\delta_{shift}=0$ | OC=0 | OC=1 | OC=2 | OC=0 | OC=1 | OC=2 |
| | 2 | 1 | 0 | CB1<0> | | | CB2<0> | | |
| | 3 | 2 | 1 | | CB1<4> | | | CB2<4> | |
| | 4 | 3 | 2 | | | CB1<8> | | | CB2<8> |
| | 5 | 4 | 3 | CB<1> | | | CB2<1> | | |
| | 6 | 5 | 4 | | CB1<5> | | | CB2<5> | |
| | 7 | 6 | 5 | | | CB1<9> | | | CB2<9> |
| | 8 | 7 | 6 | CB1<2> | | | CB2<2> | | |
| | 9 | 8 | 7 | | CB1<6> | | | CB2<6> | |
| | 10 | 9 | 8 | | | CB1<10> | | | CB2<10> |
| | 11 | 10 | 8 | CB1<3> | | | CB2<3> | | |
| | 0 | 11 | 10 | | CB1<7> | | | CB2<7> | |
| | 1 | 0 | 11 | | | CB1<11> | | | CB2<11> |

| CS | $\Delta_{shift}=3$ | | | Timeslot #1 | | | Timeslot #2 | | |
|---|---|---|---|---|---|---|---|---|---|
| | $\delta_{shift}=2$ | $\delta_{shift}=1$ | $\delta_{shift}=0$ | OC=0 | OC=1 | OC=2 | OC=0 | OC=1 | OC=2 |
| | 2 | 1 | 0 | UE<0> | | | UE<8> | | |
| | 3 | 2 | 1 | | UE<4> | | | UE<5> | |
| | 4 | 3 | 2 | | | UE<8> | | | UE<2> |
| | 5 | 4 | 3 | UE<1> | | | UE<4> | | |
| | 6 | 5 | 4 | | UE<5> | | | UE<1> | |
| | 7 | 6 | 5 | | | UE<9> | | | UE<11> |
| | 8 | 7 | 6 | UE<2> | | | UE<0> | | |
| | 9 | 8 | 7 | | UE<6> | | | UE<10> | |
| | 10 | 9 | 8 | | | UE<10> | | | UE<7> |
| | 11 | 10 | 9 | UE<3> | | | UE<9> | | |
| | 0 | 11 | 10 | | UE<7> | | | UE<6> | |
| | 1 | 0 | 11 | | | UE<11> | | | UE<3> |

FIG. 6

| CS | $\Delta_{shift}=2$ | | Timeslot #1 | | Timeslot #2 | |
|---|---|---|---|---|---|---|
| | $\delta_{shift}=1$ | $\delta_{shift}=0$ | OC=0 | OC=2 | OC=0 | OC=2 |
| | 1 | 0 | CB1<0> | | CB2<0> | |
| | 2 | 1 | | CB1<6> | | CB2<6> |
| | 3 | 2 | CB1<1> | | CB2<1> | |
| | 4 | 3 | | CB1<7> | | CB2<7> |
| | 5 | 4 | CB1<2> | | CB2<2> | |
| | 6 | 5 | | CB1<8> | | CB2<8> |
| | 7 | 6 | CB1<3> | | CB2<3> | |
| | 8 | 7 | | CB1<9> | | CB2<9> |
| | 9 | 8 | CB1<4> | | CB2<4> | |
| | 10 | 9 | | CB1<10> | | CB2<10> |
| | 11 | 10 | CB1<5> | | CB2<5> | |
| | 0 | 11 | | CB1<11> | | CB2<11> |

| CS | $\Delta_{shift}=2$ | | Timeslot #1 | | Timeslot #2 | |
|---|---|---|---|---|---|---|
| | $\delta_{shift}=1$ | $\delta_{shift}=0$ | OC=0 | OC=2 | OC=0 | OC=2 |
| | 1 | 0 | UE<0> | | UE<6> | |
| | 2 | 1 | | UE<6> | | UE<9> |
| | 3 | 2 | UE<1> | | UE<0> | |
| | 4 | 3 | | UE<7> | | UE<3> |
| | 5 | 4 | UE<2> | | UE<7> | |
| | 6 | 5 | | UE<8> | | UE<10> |
| | 7 | 6 | UE<3> | | UE<1> | |
| | 8 | 7 | | UE<9> | | UE<4> |
| | 9 | 8 | UE<4> | | UE<8> | |
| | 10 | 9 | | UE<10> | | UE<11> |
| | 11 | 10 | UE<5> | | UE<2> | |
| | 0 | 11 | | UE<11> | | UE<5> |

FIG. 7

| | $\Delta_{shift}=3$ | | | Timeslot #1 | | Timeslot #2 | |
|---|---|---|---|---|---|---|---|
| | $\delta_{shift}=2$ | $\delta_{shift}=1$ | $\delta_{shift}=0$ | OC=0 | OC=2 | OC=0 | OC=2 |
| | 2 | 1 | 0 | CB1<0> | | CB2<0> | |
| | 3 | 2 | 1 | | CB1<4> | | CB2<4> |
| | 4 | 3 | 2 | | | | |
| | 5 | 4 | 3 | CB<1> | | CB2<1> | |
| C | 6 | 5 | 4 | | CB1<5> | | CB2<5> |
| S | 7 | 6 | 5 | | | | |
| | 8 | 7 | 6 | CB1<2> | | CB2<2> | |
| | 9 | 8 | 7 | | CB1<6> | | CB2<6> |
| | 10 | 9 | 8 | | | | |
| | 11 | 10 | 9 | CB1<3> | | CB2<3> | |
| | 0 | 11 | 10 | | CB1<7> | | CB2<7> |
| | 1 | 0 | 11 | | | | |

| | $\Delta_{shift}=3$ | | | Timeslot #1 | | Timeslot #2 | |
|---|---|---|---|---|---|---|---|
| | $\delta_{shift}=2$ | $\delta_{shift}=1$ | $\delta_{shift}=0$ | OC=0 | OC=2 | OC=0 | OC=2 |
| | 2 | 1 | 0 | UE<0> | | UE<4> | |
| | 3 | 2 | 1 | | UE<4> | | UE<6> |
| | 4 | 3 | 2 | | | | |
| | 5 | 4 | 3 | UE<1> | | UE<0> | |
| C | 6 | 5 | 4 | | UE<5> | | UE<2> |
| S | 7 | 6 | 5 | | | | |
| | 8 | 7 | 6 | UE<2> | | UE<5> | |
| | 9 | 8 | 7 | | UE<6> | | UE<7> |
| | 10 | 9 | 8 | | | | |
| | 11 | 10 | 9 | UE<3> | | UE<1> | |
| | 0 | 11 | 10 | | UE<7> | | UE3> |
| | 1 | 0 | 11 | | | | |

FIG. 8

| CS | Timeslot #1 | Timeslot #2 |
|---|---|---|
| 0 | UE<0> | UE<8> |
| 1 | UE<1> | UE<4> |
| 2 | UE<2> | UE<0> |
| 3 | UE<3> | UE<9> |
| 4 | UE<4> | UE<5> |
| 5 | UE<5> | UE<1> |
| 6 | UE<6> | UE<10> |
| 7 | UE<7> | UE<6> |
| 8 | UE<8> | UE<2> |
| 9 | UE<9> | UE<11> |
| 10 | UE<10> | UE<7> |
| 11 | UE<11> | UE<3> |

FIG. 9

| CS | Timeslot #1 | Timeslot #2 |
|---|---|---|
| 0 | UE<0> | UE<11> |
| 1 | UE<1> | UE<10> |
| 2 | UE<2> | UE<9> |
| 3 | UE<3> | UE<8> |
| 4 | UE<4> | UE<7> |
| 5 | UE<5> | UE<6> |
| 6 | UE<6> | UE<5> |
| 7 | UE<7> | UE<4> |
| 8 | UE<8> | UE<3> |
| 9 | UE<9> | UE<2> |
| 10 | UE<10> | UE<1> |
| 11 | UE<11> | UE<0> |

FIG. 10

| | $\Delta_{shift}=1$ | Timeslot #1 | | | Timeslot #2 | | |
|---|---|---|---|---|---|---|---|
| | $\delta_{shift}=0$ | OC=0 | OC=1 | OC=2 | OC=0 | OC=1 | OC=2 |
| | 0 | CB1<0> | CB1<6> | CB1<12> | CB2<0> | CB2<6> | CB2<12> |
| | 1 | CB1<1> | CB1<7> | CB1<13> | CB2<1> | CB2<7> | CB2<13> |
| | 2 | CB1<2> | CB1<8> | CB1<14> | CB2<2> | CB2<8> | CB2<14> |
| | 3 | CB1<3> | CB1<9> | CB1<15> | CB2<3> | CB2<9> | CB2<15> |
| C | 4 | CB1<4> | CB1<10> | CB1<16> | CB2<4> | CB2<10> | CB2<16> |
| S | 5 | CB1<5> | CB1<11> | CB1<17> | CB2<5> | CB2<11> | CB2<17> |
| | 6 | CS Protection interval | | | CS Protection interval | | |
| | 7 | CQI<0> | | | CQI<0> | | |
| | 8 | CQI<1> | | | CQI<1> | | |
| | 9 | CQI<2> | | | CQI<2> | | |
| | 10 | CQI<3> | | | CQI<3> | | |
| | 11 | CS Protection interval | | | CS Protection interval | | |

| | $\Delta_{shift}=1$ | Timeslot #1 | | | Timeslot #2 | | |
|---|---|---|---|---|---|---|---|
| | $\delta_{shift}=0$ | OC=0 | OC=1 | OC=2 | OC=0 | OC=1 | OC=2 |
| | 0 | ACK_UE<0> | ACK_UE<6> | ACK_UE<12> | ACK_UE<12> | ACK_UE<14> | ACK_UE<16> |
| | 1 | ACK_UE<1> | ACK_UE<7> | ACK_UE<13> | ACK_UE<6> | ACK_UE<8> | ACK_UE<10> |
| | 2 | ACK_UE<2> | ACK_UE<8> | ACK_UE<14> | ACK_UE<0> | ACK_UE<2> | ACK_UE<4> |
| | 3 | ACK_UE<3> | ACK_UE<9> | ACK_UE<15> | ACK_UE<13> | ACK_UE<15> | ACK_UE<17> |
| C | 4 | ACK_UE<4> | ACK_UE<10> | ACK_UE<16> | ACK_UE<7> | ACK_UE<9> | ACK_UE<11> |
| S | 5 | ACK_UE<5> | ACK_UE<11> | ACK_UE<17> | ACK_UE<1> | ACK_UE<3> | ACK_UE<5> |
| | 6 | CS Protection interval | | | CS Protection interval | | |
| | 7 | CQI_UE<0> | | | CQI_UE<3> | | |
| | 8 | CQI_UE<1> | | | CQI_UE<2> | | |
| | 9 | CQI_UE<2> | | | CQI_UE<1> | | |
| | 10 | CQI_UE<3> | | | CQI_UE<0> | | |
| | 11 | CS Protection interval | | | CS Protection interval | | |

FIG. 11

| CS | $\Delta_{shift}=2$ | | Timeslot #1 | | | Timeslot #2 | | |
|---|---|---|---|---|---|---|---|---|
| | $\delta_{shift}=1$ | $\delta_{shift}=0$ | OC=0 | OC=1 | OC=2 | OC=0 | OC=1 | OC=2 |
| | 1 | 0 | CB1<0> | | CB1<6> | CB2<0> | | CB2<6> |
| | 2 | 1 | | CB1<3> | | | CB2<3> | |
| | 3 | 2 | CB1<1> | | CB1<7> | CB2<1> | | CB2<7> |
| | 4 | 3 | | CB1<4> | | | CB2<4> | |
| | 5 | 4 | CB1<2> | | CB1<8> | CB2<2> | | CB2<8> |
| | 6 | 5 | | CB1<5> | | | CB2<5> | |
| | 7 | 6 | CS Protection interval | | | CS Protection interval | | |
| | 8 | 7 | CQI<0> | | | CQI<0> | | |
| | 9 | 8 | CQI<1> | | | CQI<1> | | |
| | 10 | 9 | CQI<2> | | | CQI<2> | | |
| | 11 | 10 | CQI<3> | | | CQI<3> | | |
| | 0 | 11 | CS Protection interval | | | CS Protection interval | | |

| CS | $\Delta_{shift}=2$ | | Timeslot #1 | | | Timeslot #2 | | |
|---|---|---|---|---|---|---|---|---|
| | $\delta_{shift}=1$ | $\delta_{shift}=0$ | OC=0 | OC=1 | OC=2 | OC=0 | OC=1 | OC=2 |
| | 1 | 0 | ACK_UE<0> | | ACK_UE<6> | ACK_UE<6> | | ACK_UE<8> |
| | 2 | 1 | | ACK_UE<3> | | | ACK_UE<7> | |
| | 3 | 2 | ACK_UE<1> | | ACK_UE<7> | ACK_UE<3> | | ACK_UE<5> |
| | 4 | 3 | | ACK_UE<4> | | | ACK_UE<4> | |
| | 5 | 4 | ACK_UE<2> | | ACK_UE<8> | ACK_UE<0> | | ACK_UE<2> |
| | 6 | 5 | | ACK_UE<5> | | | ACK_UE<1> | |
| | 7 | 6 | CS Protection interval | | | CS Protection interval | | |
| | 8 | 7 | CQI_UE<0> | | | CQI_UE<3> | | |
| | 9 | 8 | CQI_UE<1> | | | CQI_UE<2> | | |
| | 10 | 9 | CQI_UE<2> | | | CQI_UE<1> | | |
| | 11 | 10 | CQI_UE<3> | | | CQI_UE<0> | | |
| | 0 | 11 | CS Protection interval | | | CS Protection interval | | |

FIG. 12

| CS | $\Delta_{shift}=3$ | | |
|---|---|---|---|
| | $\delta_{shift}=2$ | $\delta_{shift}=1$ | $\delta_{shift}=0$ |
| | 2 | 1 | 0 |
| | 3 | 2 | 1 |
| | 4 | 3 | 2 |
| | 5 | 4 | 3 |
| | 6 | 5 | 4 |
| | 7 | 6 | 5 |
| | 8 | 7 | 6 |
| | 9 | 8 | 7 |
| | 10 | 9 | 8 |
| | 11 | 10 | 9 |
| | 0 | 11 | 10 |
| | 1 | 0 | 11 |

| Timeslot #1 | | |
|---|---|---|
| OC=0 | OC=1 | OC=2 |
| CB1<0> | | |
| | CB1<2> | |
| | | CB1<4> |
| CB1<1> | | |
| | CB1<3> | |
| | | CB1<5> |
| CS Protection interval | | |
| CQI<0> | | |
| CQI<1> | | |
| CQI<2> | | |
| CQI<3> | | |
| CS Protection interval | | |

| Timeslot #2 | | |
|---|---|---|
| OC=0 | OC=1 | OC=2 |
| CB2<0> | | |
| | CB2<2> | |
| | | CB2<4> |
| CB2<1> | | |
| | CB2<3> | |
| | | CB2<5> |
| CS Protection interval | | |
| CQI<0> | | |
| CQI<1> | | |
| CQI<2> | | |
| CQI<3> | | |
| CS Protection interval | | |

| CS | $\Delta_{shift}=3$ | | |
|---|---|---|---|
| | $\delta_{shift}=2$ | $\delta_{shift}=1$ | $\delta_{shift}=0$ |
| | 2 | 1 | 0 |
| | 3 | 2 | 1 |
| | 4 | 3 | 2 |
| | 5 | 4 | 3 |
| | 6 | 5 | 4 |
| | 7 | 6 | 5 |
| | 8 | 7 | 6 |
| | 9 | 8 | 7 |
| | 10 | 9 | 8 |
| | 11 | 10 | 9 |
| | 0 | 11 | 10 |
| | 1 | 0 | 11 |

| Timeslot #1 | | |
|---|---|---|
| OC=0 | OC=1 | OC=2 |
| ACK_UE<0> | | |
| | ACK_UE<2> | |
| | | ACK_UE<4> |
| ACK_UE<1> | | |
| | ACK_UE<3> | |
| | | ACK_UE<5> |
| CS Protection interval | | |
| CQI_UE<0> | | |
| CQI_UE<1> | | |
| CQI_UE<2> | | |
| CQI_UE<3> | | |
| CS Protection interval | | |

| Timeslot #2 | | |
|---|---|---|
| OC=0 | OC=1 | OC=2 |
| ACK_UE<4> | | |
| | ACK_UE<0> | |
| | | ACK_UE<3> |
| ACK_UE<2> | | |
| | ACK_UE<5> | |
| | | ACK_UE<1> |
| CS Protection interval | | |
| CQI_UE<3> | | |
| CQI_UE<2> | | |
| CQI_UE<1> | | |
| CQI_UE<0> | | |
| CS Protection interval | | |

FIG. 13

| CS | $\Delta_{shift}=2$ | | Timeslot #1 | | Timeslot #2 | |
|---|---|---|---|---|---|---|
| | $\delta_{shift}=1$ | $\delta_{shift}=0$ | OC=0 | OC=2 | OC=0 | OC=2 |
| | 1 | 0 | CB1<0> | | CB2<0> | |
| | 2 | 1 | | CB1<3> | | CB2<3> |
| | 3 | 2 | CB1<1> | | CB2<1> | |
| | 4 | 3 | | CB1<4> | | CB2<4> |
| | 5 | 4 | CB1<2> | | CB2<2> | |
| | 6 | 5 | | CB1<5> | | CB2<5> |
| | 7 | 6 | CS Protection interval | | CS Protection interval | |
| | 8 | 7 | CQI<0> | | CQI<0> | |
| | 9 | 8 | CQI<1> | | CQI<1> | |
| | 10 | 9 | CQI<2> | | CQI<2> | |
| | 11 | 10 | CQI<3> | | CQI<3> | |
| | 0 | 11 | CS Protection interval | | CS Protection interval | |

| CS | $\Delta_{shift}=2$ | | Timeslot #1 | | Timeslot #2 | |
|---|---|---|---|---|---|---|
| | $\delta_{shift}=1$ | $\delta_{shift}=0$ | OC=0 | OC=2 | OC=0 | OC=2 |
| | 1 | 0 | ACK_UE<0> | | ACK_UE<3> | |
| | 2 | 1 | | ACK_UE<3> | | ACK_UE<1> |
| | 3 | 2 | ACK_UE<1> | | ACK_UE<0> | |
| | 4 | 3 | | ACK_UE<4> | | ACK_UE<5> |
| | 5 | 4 | ACK_UE<2> | | ACK_UE<4> | |
| | 6 | 5 | | ACK_UE<5> | | ACK_UE<2> |
| | 7 | 6 | CS Protection interval | | CS Protection interval | |
| | 8 | 7 | CQI_UE<0> | | CQI_UE<3> | |
| | 9 | 8 | CQI_UE<1> | | CQI_UE<2> | |
| | 10 | 9 | CQI_UE<2> | | CQI_UE<1> | |
| | 11 | 10 | CQI_UE<3> | | CQI_UE<0> | |
| | 0 | 11 | CS Protection interval | | CS Protection interval | |

FIG. 14

| CS | $\Delta_{shift}=3$ | | | Timeslot #1 | | Timeslot #2 | |
|---|---|---|---|---|---|---|---|
| | $\delta_{shift}=2$ | $\delta_{shift}=1$ | $\delta_{shift}=0$ | OC=0 | OC=2 | OC=0 | OC=2 |
| | 2 | 1 | 0 | CB1<0> | | CB2<0> | |
| | 3 | 2 | 1 | | CB1<2> | | CB2<2> |
| | 4 | 3 | 2 | | | | |
| | 5 | 4 | 3 | CB1<1> | | CB2<1> | |
| | 6 | 5 | 4 | | CB1<2> | | CB2<3> |
| | 7 | 6 | 5 | | | | |
| | 8 | 7 | 6 | CS Protection interval | | CS Protection interval | |
| | 9 | 8 | 7 | CQI<0> | | CQI<0> | |
| | 10 | 9 | 8 | CQI<1> | | CQI<1> | |
| | 11 | 10 | 9 | CQI<2> | | CQI<2> | |
| | 0 | 11 | 10 | CQI<3> | | CQI<3> | |
| | 1 | 0 | 11 | CS Protection interval | | CS Protection interval | |

| CS | $\Delta_{shift}=3$ | | | Timeslot #1 | | Timeslot #2 | |
|---|---|---|---|---|---|---|---|
| | $\delta_{shift}=2$ | $\delta_{shift}=1$ | $\delta_{shift}=0$ | OC=0 | OC=2 | OC=0 | OC=2 |
| | 2 | 1 | 0 | ACK_UE<0> | | ACK_UE<2> | |
| | 3 | 2 | 1 | | ACK_UE<2> | | ACK_UE<3> |
| | 4 | 3 | 2 | | | | |
| | 5 | 4 | 3 | ACK_UE<1> | | ACK_UE<0> | |
| | 6 | 5 | 4 | | ACK_UE<3> | | ACK_UE<1> |
| | 7 | 6 | 5 | | | | |
| | 8 | 7 | 6 | CS Protection interval | | CS Protection interval | |
| | 9 | 8 | 7 | CQI_UE<0> | | CQI_UE<3> | |
| | 10 | 9 | 8 | CQI_UE<1> | | CQI_UE<2> | |
| | 11 | 10 | 9 | CQI_UE<2> | | CQI_UE<1> | |
| | 0 | 11 | 10 | CQI_UE<3> | | CQI_UE<0> | |
| | 1 | 0 | 11 | CS Protection interval | | CS Protection interval | |

FIG. 15

METHOD FOR INTERFERENCE RANDOMIZATION OF PHYSICAL UPLINK CONTROL CHANNEL

CROSS-REFERENCE TO RELATED APPLICATION

This application is the U.S. national phase of PCT Appln. No. PCT/CN2008/073353 filed Dec. 5, 2008 which claims priority to Chinese Application No. 200810094545.8 filed Apr. 22, 2008, the disclosures of which are incorporated in their entirety by reference herein.

TECHNICAL FIELD

The present invention relates to the field of wireless communication, and more especially, to method for interference randomization in a physical uplink control channel (PUCCH).

BACKGROUND OF THE INVENTION

To date, it is specified in Long Term Evolution (LTE) system that PUCCH is transmitted using the fixed time-frequency resource if User Equipment (UE) has no uplink data to send. Every UE that sends control signalings in the PUCCH of the same resource block in the cell uses one control channel through code division multiplexing. As shown in FIG. 1, one control channel for one UE occupies a bandwidth of one resource block (RB) (one resource block has 12 sub-carriers) in frequency domain, and two adjacent timeslots constitute one sub-frame, that is, 1 ms in time domain. According to different cyclic prefixes used by the current sub-frame, the number of symbols within the sub-frame is different. Moreover, the control channel frequency-hops in two timeslots to obtain the diversity gain in frequency domain. Since the number of UEs that can be multiplexed in one resource block is limited, when the number of UEs which need to simultaneously send uplink control signalings through the PUCCH within the cell exceeds that of UEs that can be multiplexed in one resource block, another resource block might be opened up, that is, implementing the multiplexing of the PUCCH by each UE in a cell by a way of combination of code division and frequency division.

In the current LTE system, PUCCH is capable of supporting several types of uplink control signalings, including acknowledgement/non-acknowledgement message (ACK/NACK), channel quality indicator (CQI), scheduling request (SR), or their combinations, that is, several types of uplink control signalings are sent simultaneously, wherein, ACK/NACK and SR are sent in the control channel format 1 and CQI is sent in control channel Format 2. All kinds of PUCCHs are described briefly in the following.

As shown in FIG. 2, ACK/NACK is BPSK (binary phase shift keying) or QPSK (quadrature phase shift keying) modulated to form a modulation symbol, and the modulation symbol is spectrum spread with spreading factor of 12 in frequency domain, wherein the spread spectrum sequence is a CAZAC (constant amplitude zero auto correlation) sequence whose length is 12, and then the modulation symbol is spread with a Walsh code whose length is 4 in time domain and then mapped to the information symbol corresponding to the control channel format 1 shown in FIG. 2 (wherein ▨ denotes the information symbol and ▨ denotes the pilot frequency symbol, namely, the reference signal), that is to say, l=0, 1, 5, 6, where l is the index of the symbol.

The reference signal, mainly used as the channel estimation of the information symbol carries no information and is processed the same as the information symbol, that is, spectrum spread with the spreading factor of 12 in frequency domain, and then spread with an orthogonal sequence whose length is 3 (normal cyclic prefix) or 2 (extended cyclic prefix) in time domain, and finally, the reference signal along with the ACK/NACK information symbol constitutes a signal for sending in one timeslot. Therefore, the number of UEs multiplexed to simultaneously send ACK/NACK in one resource block is determined by the number of the relatively short orthogonal codes in time domain and the cyclic shifts of the CAZAC sequence allowed using in the same orthogonal code. The number of relatively short orthogonal codes in time domain is 3 when the cyclic prefix is the normal cyclic prefix and 2 when it is the extended cyclic prefix, while the cyclic shifts of the CAZAC sequence allowed to use in the same orthogonal code depends on the application scenarios. Generally, the ACK/NACK channel can be represented by the combination of the cyclic shift (CS) of the CAZAC sequence used by the channel and the corresponding index of the orthogonal code (OC) in time domain, that is, CB=<OC, CS>.

As shown in FIG. 3, CQI is encoded into 20 bits, and then QPSK modulated into 10 modulated symbols S0~S9, each modulated symbol is spectrum spread with a spreading factor of 12 in frequency domain (and the spread spectrum sequence is a CAZAC sequence with the length of 12), and then mapped to the information symbol corresponding to the control channel format 2 shown in FIG. 3. The role of the reference signal is the same as that of ACK/NACK, after being spectrum spread with a spreading factor of 12 in frequency domain, the reference signal along with the CQI constitutes a signal for sending in one timeslot. Therefore, in one resource block, the number of UEs multiplexed to simultaneously send CQI is determined by the number of the cyclic shifts of the CAZAC sequence allowed to use. Generally, CQI channel may be represented by the cyclic shift (CS) of the CAZAC sequence used by the channel.

In general, the UEs sending ACK/NACK and those sending CQI use different resource blocks to send their corresponding uplink control signalings, LTE also supports that ACK/NACK and CQI of different UEs are sent in the same resource block at present, and it is specified that there is only one such resource block at most, and it is called "the mixed resource block".

Normally, different cells are allocated with different CAZAC root sequences as their spectrum spreading sequences, while the control channel of each UE in the cell uses different cyclic shifts of the same CAZAC sequence. Since the correlation of different cyclic shifts of different CAZAC root sequences is different, the cyclic shifts of the CAZAC sequences used in each symbol in uplink control channel is different in order to make the interference among the cells randomized, that is, the cyclic shifts of the CAZAC sequence corresponding to each symbol hops as time, and the hopping pattern is cell-specific (the hopping patterns of all UEs in the cell are the same), that is, in the symbols whose timeslot number and the time domain number are the same, the interval of cyclic shifts of the sequence used by every two UEs is the same for all the UEs in the cell.

In addition, in order to further improve the performance of uplink control channel, intra-cell interference randomization should be taken into account. From the above content, it can be seen that the control channel of each UE which sends uplink control signaling in the PUCCH of one resource block in the cell is code division multiplexed, and in the ideal channel, the control channel of each UE in the cell is ideally orthogonal, in the practical channel however, the orthogonality of the control channel of each UE is damaged due to the channel fading delay and the Doppler shift because of the moving of UE, therefore, the control channels of the UEs in the cell are interfered with each other. For different uplink control channels, their interference is different. For ACK/NACK channel, the damage of orthogonality comes from two sides, on one side, the orthogonality of the CAZAC sequence in frequency domain is damaged due to the channel time delay spread, moreover the orthogonality is related to the difference of the cyclic shift of the CAZAC sequence used, for instance, the orthogonality is relatively poor in the delay fading channel when the difference of the cyclic shift is relatively small, such as the adjacent cyclic shifts, while maintains well when the cyclic shifts have relatively large interval; on the other side, the orthogonal codes in time domain are damaged due to the Doppler shift and the damage degree is related to the moving speed of UE. For CQI channel, the reason of the damage to the orthogonality is that the orthogonality of CAZAC sequence in frequency domain is damaged because of the time delay spread of the channel.

As mentioned above, since the hopping patterns of cyclic shifts of CAZAC sequence are cell-specific, that is, the hopping patterns of all UEs in the cell are the same, therefore, if two UEs use control channels which interfere with each other severely, the interference in the sustained period of control channel is relatively severe.

SUMMARY OF THE INVENTION

The present invention offers a method for interference randomization in the PUCCH to make the interference among the UEs multiplexed in the same PUCCH randomized.

In order to solve the above technical problem, the present invention offers a method for interference randomization in the PUCCH. The UE uses different PUCCHs to send uplink control signalings in the first and second timeslots of a sub-frame.

Furthermore, said PUCCHs only multiplex the UEs sending ACK/NACK messages, and when said UEs send the ACK/NACK messages in the PUCCHs in the first and second timeslots of a sub-frame, the orthogonal codes in time domain in use are the same while cyclic shifts of a CAZAC sequence are different, or the orthogonal codes in time domain in use are different while the cyclic shifts of the CAZAC sequence are the same, or both the orthogonal codes in time domain in use and the cyclic shifts of the CAZAC sequence are different.

Furthermore, said UEs send the ACK/NACK messages in the control channel with a control channel resource index of i in the first timeslot and in the control channel with a control channel resource index of g(i, d, N) in the second timeslot, and the number of control channels provided for the UEs sending ACK/NACK messages in the first and second timeslots are N respectively and order thereof is the same, where, $0 \leq i \leq N-1$ $$g(i,d,N)=((i+1) \times d) \bmod(N+1)-1$$

the value of N is $c \times N_{SC}^{RB}/\Delta_{shift}^{PUCCH}$, where,
c is the number of the orthogonal codes in time domain;
$N_{SC}^{RB}$ is the number of sub-carriers occupied by a resource block in which said control channel is located;
$\Delta_{shift}^{PUCCH}$ is interval of the cyclic shifts of the CAZAC sequence in the same orthogonal code in time domain;
d is a natural number prime with N+1; mod denotes modulo operation.

Furthermore, said PUCCHs only multiplex the UEs sending CQIs, and when said UEs send the CQIs in the PUCCHs in the first and second timeslots of the sub-frame, cyclic shifts of a CAZAC sequence in use are different.

Furthermore, said UEs send the CQIs in the control channel with a control channel resource index of i in the first timeslot, and send the CQIs in the control channel with a control channel resource index of g(i, c', N) in the second timeslot, and the number of the control channels for the UEs sending CQIs in the first and second timeslots is N respectively and order thereof is the same, where, $0 \leq i \leq N-1$, $$g(i,c',N)=((i+1) \times c') \bmod(N+1)-1$$

Where, N is the number of the cyclic shifts of the CAZAC sequence; c' is a natural number prime with N+1; mod denotes modulo operation.

Furthermore, said PUCCHs multiplex both the UEs sending ACK/NACK messages and the UEs sending CQIs, wherein, when said UEs send the ACK/NACK messages in the PUCCHs in the first and second timeslots of a sub-frame, orthogonal codes in time domain in use are the same while cyclic shifts of a CAZAC sequence are different, or the orthogonal codes in time domain in use are different while the cyclic shifts of the CAZAC sequence are the same, or both the orthogonal codes in time domain in use and the cyclic shifts of the CAZAC sequence are different; when said UEs send CQIs in the PUCCH in the first and second timeslots of the sub-frame, cyclic shifts of a CAZAC sequence are different.

Furthermore, the number of the cyclic shifts of the CAZAC sequence sending the ACK/NACK messages is $N_{CS}^{(1)}$, while that of the cyclic shifts of the CAZACS sending the CQIs is $N_{CS}^{(2)}$;

said UEs sending the ACK/NACK messages send the ACK/NACK messages in a control channel with a control channel resource index of i in the first timeslot, and in the control channel with a control channel resource index of g1(i, d, N) in the second timeslot, and the number of the control channels for the UEs sending ACK/NACK messages in the first and second timeslots is N respectively and order thereof is the same, $0 \leq i \leq N-1$, where, $$g(i,d,N)=((i+1) \times d) \bmod(N+1)-1$$

The value of N is $c \times N_{CS}^{(1)}/\Delta_{shift}^{PUCCH}$, where,
c is the number of orthogonal codes in time domain;
$\Delta_{shift}^{PUCCH}$ is interval of the cyclic shifts of the CAZAC sequence in the same orthogonal code in time domain;
d is a natural number prime with N+1; mod denotes modulo operation.

Furthermore, said UEs sending CQIs send CQIs in the control channel with a control channel resource index of j in the first timeslot and send CQIs in the control channels with a control channel resource index of g2(j,c',$N_{CS}^{(2)}$) in the second timeslot, and the number of control channels for the UEs sending CQIs in the first and second timeslots is $N_{CS}^{(2)}$ respectively and order thereof is the same, $0 \leq j \leq N_{CS}^{(2)}-1$, where, $$g2(j,c',N_{CS}^{(2)})=((j+1)*c') \bmod(N_{CS}^{(2)}+1)-1$$

c' is a natural number prime with $N_{CS}^{(2)}+1$; mod denotes modulo operation.

Furthermore, $N_{CS}^{(2)}=N_{SC}^{RB}-2-N_{CS}^{(1)}$, and $N_{SC}^{RB}$ is the number of sub-carriers occupied by a resource block in which said control channels are located.

Furthermore, the value of d is the number of orthogonal codes in time domain, that is, d=c.

Furthermore, the value of c is 3 when said PUCCH uses a normal cyclic prefix and 2 when it uses an extended cyclic prefix.

Furthermore, the value of c' is the number of cyclic shifts of the CAZAC sequence for sending CQIs in the control channels, that is, $c'=N_{sc}^{RB}$ or $c'=N_{cs}^{(2)}$.

In order to solve the above problem, the present invention also offers a method for interference randomization in a PUCCH, applied in LTE system, and the method comprises when a plurality of UEs are multiplexed in the PUCCH to send uplink control signalings, difference of indexes of control channel resource used by any two UEs in the first timeslot of the PUCCH being different from that of indexes of control channel resource used by the two UEs in the second timeslot.

In order to solve the above problem, the present invention also offers a method for interference randomization in a PUCCH, applied in LTE system, comprising:

UEs sending ACK/NACK messages in the control channel with the control channel resource index of i in the first timeslot and in the control channel with a control channel resource index of g(i, d, N) in the second timeslot, and $$g(i,d,N)=((i+1)\times d)\bmod(N+1)-1$$

in the equation, $0 \leq i \leq N-1$, $N=c \times N_{SC}^{RB}/\Delta_{shift}^{PUCCH}$, where, c is the number of orthogonal codes in time domain, $N_{SC}^{RB}$ is the number of sub-carriers occupied by one resource block; $\Delta_{shift}^{PUCCH}$ is interval of cyclic shifts of a CAZAC sequence in the same orthogonal code in time domain; d is a natural number prime with N+1; mod denotes modulo operation.

Furthermore, c=3 when said PUCCH uses a normal cyclic prefix, and c=2 and d=c when it uses an extended cyclic prefix.

From the above description, it can be seen that for the three cases in the present invention, the methods of control channel remapping in the second timeslot used by the UE have the same basic principle and all apply the prime-modulo methods, so as to have the advantages of uniform form and simple implementation. With the methods of the present invention, it can guarantee that the interference among the UEs multiplexed in one resource block or in one hybrid resource block is equalized and randomized in the sustained period of the control channel, thus the interference of the PUCCH of each UE in the cell is randomized and the receipt performance of PUCCH is improved.

BRIEF DESCRIPTION OF DRAWINGS

FIG. 4 is an illustration of the control channels used by each user in two timeslots by applying the method of the present invention when only the UEs sending ACK/NACK are multiplexed in one resource block in accordance with the first embodiment of the present invention;

FIG. 5 is an illustration of the control channels used by each user in two timeslots by applying the method of the present invention when only the UEs sending ACK/NACK are multiplexed in one resource block in accordance with the second embodiment of the present invention;

FIG. 6 is an illustration of the control channels used by each user in two timeslots by applying the method of the present invention when only the UEs sending ACK/NACK are multiplexed in one resource block in accordance with the third embodiment of the present invention;

FIG. 7 is an illustration of the control channels used by each user in two timeslots by applying the method of the present invention when only the UEs sending ACK/NACK are multiplexed in one resource block in accordance with the fourth embodiment of the present invention;

FIG. 8 is an illustration of the control channels used by each user in two timeslots by applying the method of the present invention when only the UEs sending ACK/NACK are multiplexed in one resource block in accordance with the fifth embodiment of the present invention;

FIG. 9 is an illustration of the control channels used by each user in two timeslots by applying the method of the present invention when only the UEs sending CQIs are multiplexed in one resource block in accordance with the sixth embodiment of the present invention;

FIG. 10 is an illustration of the control channels used by each user in two timeslots by applying the method of the present invention when only the UEs sending CQIs are multiplexed in one resource block in accordance with the seventh embodiment of the present invention;

FIG. 11 is an illustration of the control channels used by each user in two timeslots by applying the method of the present invention when both the UEs sending ACK/NACK and those sending CQIs are multiplexed in one resource block in accordance with the eighth embodiment of the present invention;

FIG. 12 is an illustration of the control channels used by each user in two timeslots by applying the method of the present invention when both the UEs sending ACK/NACKs and those sending CQIs are multiplexed in one resource block in accordance with the ninth embodiment of the present invention;

FIG. 13 is an illustration of the control channels used by each user in two timeslots by applying the method of the present invention when both the UEs sending ACK/NACKs and those sending CQIs are multiplexed in one resource block in accordance with the tenth embodiment of the present invention;

FIG. 14 is an illustration of the control channels used by each user in two timeslots by applying the method of the present invention when both the UEs sending ACK/NACKs and those sending CQIs are multiplexed in one resource block in accordance with the eleventh embodiment of the present invention;

FIG. 15 is an illustration of the control channels used by each user in two timeslots by applying the method of the present invention when both the UEs sending ACK/NACKs and those sending CQIs are multiplexed in one resource block in accordance with the twelfth embodiment of the present invention;

PREFERRED EMBODIMENTS OF THE PRESENT INVENTION

Figure 1:
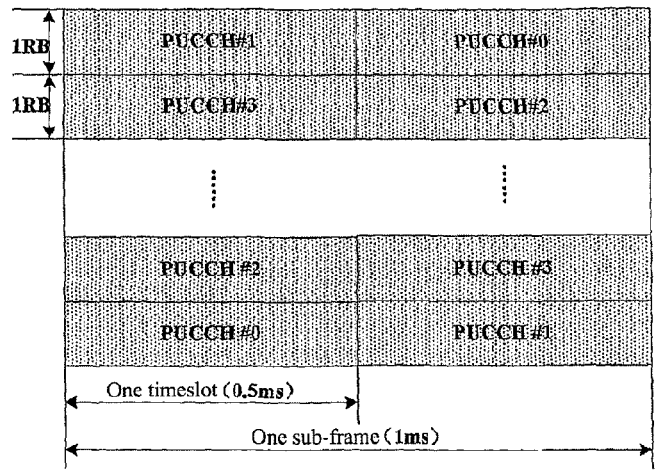
FIG. 1 is a schematic diagram of the structure of PUCCH.
Figure 2:
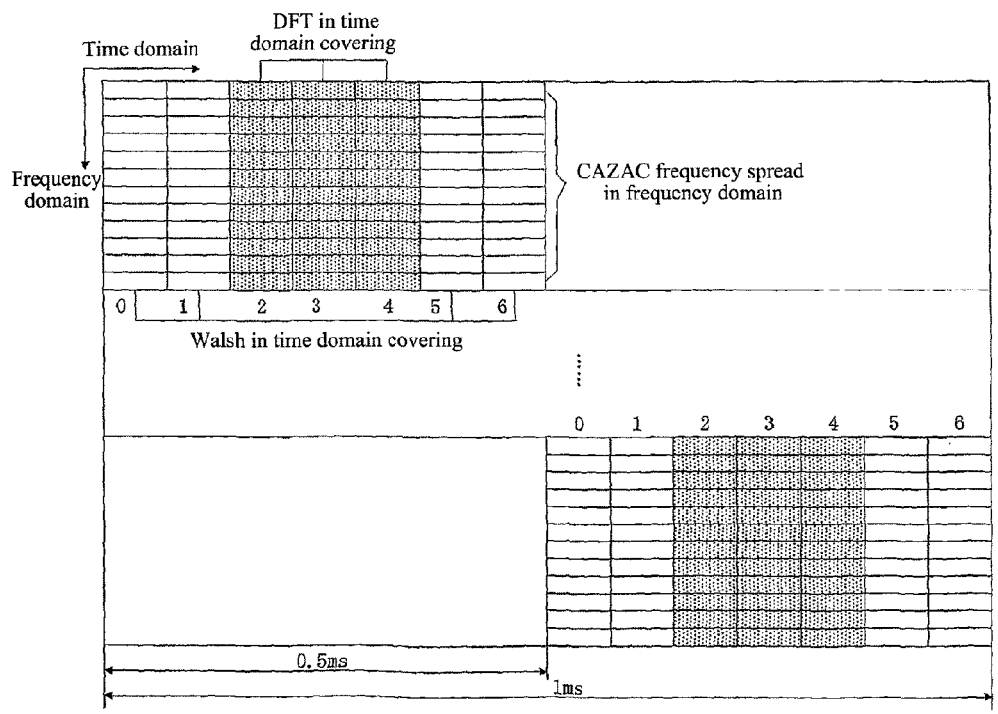
FIG. 2 is a schematic diagram of the structure of PUCCH Format 1.
Figure 3:
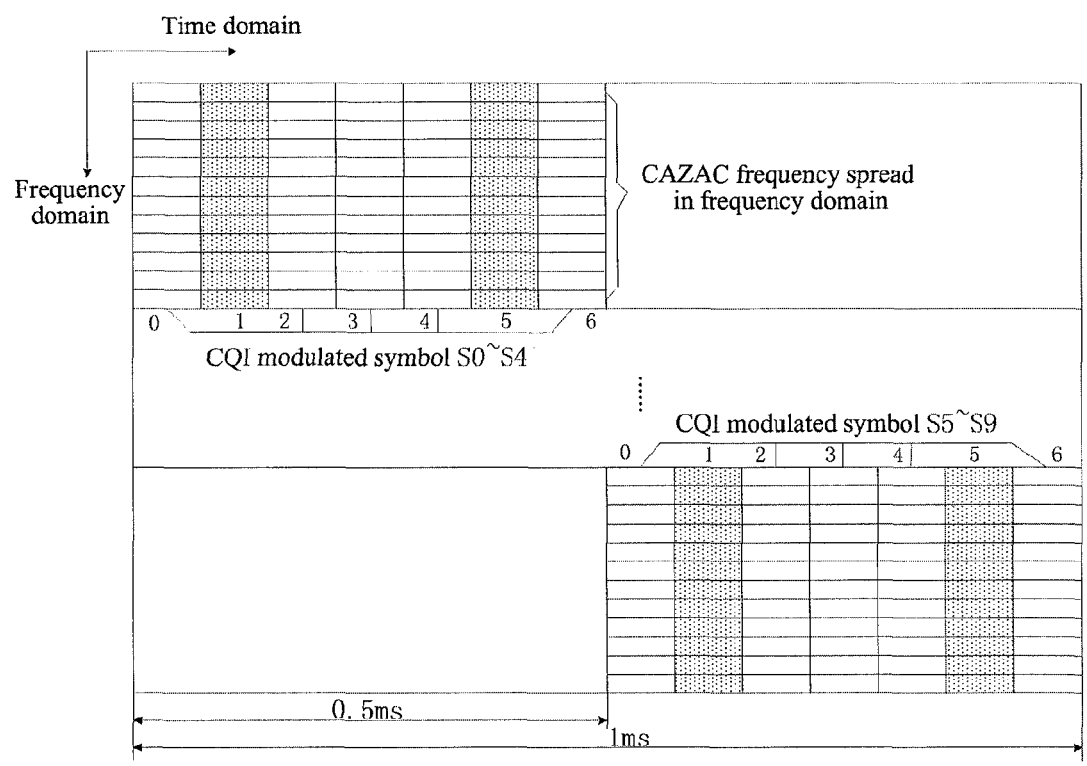
FIG. 3 is a schematic diagram of the structure of PUCCH Format 2.

In order to make the interference among the UEs multiplexed in the same RB in the same cell randomized, the control channel used by the UEs may be reselected with timeslot as unit, and differences of the indexes of the control channel resources used by different UEs are different in the first and second timeslots. Such method for interference randomization in the cell is called slot-based orthogonal code (OC)/cyclic shift (CS) remapping.

For any two UEs, such as UE1 and UE2, multiplexed in the same RB in the same cell, if the indexes of the control channel resources used by UE1 and UE2 in the first timeslot of one sub-frame are i and j respectively, then they are m and n in the second timeslot in this sub-frame respectively. The main idea of the present invention is: based on the known i and j, reasonably selecting m and n to make the interference among the UEs multiplexed in the same RB in the cell randomized. Taking the difference of the types of control channels into account, the specific implementation is described as follows:

For the ACK/NACK control channel, its resource is the OC in time domain and the CS of the CAZAC sequence. For those UEs which use the same OC in time domain in the first timeslot, they are allocated with different OCs in time domain as much as possible when remapping the control channels used in the second timeslot (since the moving speed of the UEs is middle or low at the typical application scenarios, the orthogonality of the OCs in time domain keeps good), and the interval of the CSs of the CAZAC sequence used by the UEs multiplexed in the whole resource block should be maintained as homogenous as possible. When the UEs only send the ACK/NACK in the PUCCH in the first and second timeslots of the sub-frame, the OCs in time domain in use are the same while CSs of the CAZAC sequence are different, or the OCs in time domain used are different while CSs of the CAZAC sequence are the same, or both the OCs in time domain in use and CSs of the CAZAC sequence are different.

For the CQI control channel, its resource is the CS of the CAZAC sequence. The indexes of the control channel resources used by any two UEs are i and j in the first timeslot and m and n in the second timeslot of one sub-frame, where the value of (i-j) is different from that of (m-n). That is, the cyclic shifts of the CAZAC sequence in use are different when the UEs only send CQI in the PUCCH in the first and second timeslots of the sub-frame.

When considering the method for CQI control channel resource remapping in the second timeslot of the sub-frame, whether it is compatible with the method for ACK/NACK control channel resource remapping should be determined Suppose N UEs can be multiplexed in one RB, and each UE corresponds to one ACK/NACK channel. The ACK/NACK channel can be represented by the combination of the CS of CAZAC sequence used by the channel and the index of the corresponding OC in time domain, that is, $CB_a[i]=<OC_a[u_i], CS_a[v_i]>$, where i=0, 1, ..., N-1, and $CB_a[i]$ denotes the control channel whose index of control channel resource is i, and the number of control channels and their order in two timeslots of the PUCCH are constant, which can refer to the specification of the relative standards. $u_i$ and $v_i$ respectively denote the indexes of the OC and the CS used by the $i^{th}$ ACK/NACK channel, a=1, 2 denotes the two timeslots in one sub-frame. The corresponding relationship between the $CB_a[i]$ and $OC_a[u_i]$, $CS_a[v_i]$ is shown as FIG. 4~8 and FIG. 11~15.

Remapping the control channel used by the UEs in the second timeslot of one sub-frame comprises the remapping of the following three cases:

The first case: only the UEs sending ACK/NACK are multiplexed in the resource block of the PUCCH;

The number of control channels used by the UEs to send ACK/NACK in the first and second timeslots is N respectively and their order is the same, suppose UE<i> selects the control channel $CB_1[i]$ in the first timeslot and then it will selects $CB_2[g(i, d, N)]$ in the second timeslot, $0 \leq i \leq N-1$, where, $$g(i,d,N)=((i+1)*d)\mod(N+1)-1$$

The value of N is $c \times N_{SC}^{RB}/\Delta_{shift}^{PUCCH}$, where $N_{SC}^{RB}$ denotes the number of sub-carriers occupied by one resource block or the cyclic shifts of the CAZAC sequence, and is set as 12 by the system; $\Delta_{shift}^{PUCCH}$ denotes the interval of the cyclic shifts in the same OC in time domain and its value might be 1, 2 or 3; c is the number of OCs in time domain and is related to the type of cyclic prefix used by the control channel: c is 3 when the control channel uses the normal cyclic prefix and 2 when it uses extended cyclic prefix;

d is a natural number prime with N+1 and its preferred value is c.

mod denotes modulo operation.

The second case: only UEs sending CQI are multiplexed in the resource block of the PUCCH;

The CQI control channel can be represented by the cyclic shift of the CAZAC sequence in use; there are N control channels used by the UEs to send CQI in both the first and second timeslots and their order is the same, suppose UE<i> selects the CQI control channel with CS=i in the first timeslot and then it will selects CS=g(i,c',N) in the second timeslot, $0 \leq i \leq N-1$, where, $$g(i,c',N)=((i+1)\times c')\mod(N+1)-1$$

Where N is the number of cyclic shifts of the CAZAC sequence, that is, $N=N_{SC}^{RB}$; c' is a natural number prime with N+1 and its preferred value is $N_{SC}^{RB}$; mod denotes modulo operation.

The third case: both UEs sending ACK/NACK (written as ACK_UE) and those sending CQI (CQI_UE) are multiplexed in the resource block of the PUCCH.

Suppose the cyclic shift for sending ACK/NACK is $N_{CS}^{(1)}$, take the interference between the ACK/NACK channel and the CQI channel into account, 2 CQI channel cyclic shifts are always reserved as the protection interval, thus the number of cyclic shifts for sending CQI is $N_{CS}^{(2)}=N_{SC}^{RB}-2-N_{CS}^{(1)}$, where $N_{SC}^{RB}$ is the number of sub-carriers occupied by one resource block and is set as 12 by the system;

In the hybrid resource block, the method for control channel remapping used by the ACK/NACK channel and that used by the CQI channel in the second timeslot might be discussed respectively. For the method for control channel remapping used by the ACK/NACK channel in the second timeslot, it might apply the method for remapping the resource block which only sends the ACK/NACK, and it is specified as:

ACK_UE<i> selects the control channel $CB_1[i]$ to send the ACK/NACK in the first timeslot and thus $CB_2[g1(i, c, N)]$ to send the ACK/NACK in the second timeslot; $0 \leq i \leq N-1$, $$g1(i,d,N)=((i+1)\times d)\mod(N+1)-1$$

N denotes the number of control channels which can be used to send ACK/NACK in the hybrid resource block, $N=c \times N_{CS}^{(1)}/\Delta_{shift}^{PUCCH}$, and $\Delta_{shift}$ denotes the interval of the cyclic shifts in the same OC in time domain, and its available values comprises 1, 2 and 3, meanwhile, $N_{CS}^{(1)}$ should be an integer time of $\Delta_{shift}^{PUCCH}$; c is the number of OCs in time domain and is related to the type of cyclic prefix used by the control channel: c is 3 when the control channel uses the normal cyclic prefix and 2 when it uses the extended cyclic prefix;

d is a natural number prime with N+1 and its preferred value is c.

For the method for remapping the control channels used by the CQI channel in the second timeslot, it might apply the method for remapping the resource block which only sends the CQI, and it is specified as:

CQI_UE<j> selects the CQI control channel CS=j in the first timeslot and thus $CS=g2(j,c',N_{CS}^{(2)})$ in the second timeslot; $0 \leq j \leq N_{CS}^{(2)}-1$, where:

$$g2(j,c',N_{CS}^{(2)})=((j+1)\times c')\mod(N_{CS}^{(2)}+1)-1$$

Where c' is a natural number prime with $N_{CS}^{(2)}+1$, and mod denotes modulo operation.

The method of the present invention will be described in detail in combination with the accompanying figures and the embodiments.

In the first embodiment, as shown in FIG. 4, only the UEs sending ACK/NACK are multiplexed in one resource block, and the normal cyclic prefix is used in the PUCCH, the number of available OCs is 3, and in the same OC, the allowed cyclic shift interval $\Delta_{shift}^{PUCCH}$ is 1, thus the number of UEs multiplexed to simultaneously send ACK/NACK in one resource block is $N=c\times N_{SC}^{RB}/\Delta_{shift}^{PUCCH}=3\times 12/1=36$, UE<i> selects the control channel $CB_1[i]$ in the first timeslot and thus $CB_2[g1(i, c, N)]$ in the second timeslot, $g(i,c,N)=g(i,3,36)=((i+1)\times 3)\bmod(36+1)-1;$ For instance, UE<1> uses the ACK/NACK control channel $CB_1[1]$ to send ACK/NACK information in the first timeslot, then:

$g(1,3,36)=((1+1)*3)\bmod 37-1=5$

Therefore, UE<1> uses the ACK/NACK control channel $CB_2[5]$ to send ACK/NACK information in the second timeslot.

Also for instance, UE<2> uses the ACK/NACK control channel $CB_1[2]$ to send ACK/NACK information in the first timeslot, then: $g(2,3,36)=((2+1)*3)\bmod 37-1=8$.

Therefore, UE<2> uses the ACK/NACK control channel $CB_2[8]$ to send ACK/NACK information in the second timeslot.

As shown in the figure, the UEs among UE<0>~UE<5> use the same OC in time domain in the first timeslot, and after applying the remapping method provided in the present invention, UE<0>~UE<3> and UE<4>~UE<5> use different OCs in time domain in the second timeslot. When the OCs in time domain used by some of the UEs (such as UE<0>~UE<3>) are the same, the cyclic shift intervals of the corresponding CAZAC sequence are distributed evenly and are different in two timeslots. It can be seen that after remapping, the difference of control channel indexes used in the first timeslot of the PUCCH by any two UEs is different from that used in the second timeslot. In this embodiment, the absolute value of this difference is also different, thus it can make the interference randomized to guarantee that the interference of two UEs in the second timeslot is relatively weak when it relatively strong in the first timeslot, therefore the receipt performance of the uplink control channels of the UEs multiplexed in the whole resource block is basically the same, rather than some are perfect while some others are very poor.

In the second embodiment, as shown in FIG. 5, only the UEs sending ACK/NACK are multiplexed in one resource block, and the normal cyclic prefix is used in the PUCCH, the number of available OCs is 3, and in the same OC, the allowed cyclic shift interval $\Delta_{shift}^{PUCCH}$ is 2, thus the number of UEs multiplexed to simultaneously send ACK/NACK in one resource block is $N=c\times N_{SC}^{RB}/\Delta_{shift}^{PUCCH}=3\times 12/2=18$, UE<i> selects the control channel $CB_1[i]$ in the first timeslot and thus $CB_2[g1(i, c, N)]$ in the second timeslot, $g(i,c,N)=g(i,3,18)=((i+1)\times 3)\bmod(18+1)-1;$ For instance, UE<1> uses the ACK/NACK control channel $CB_2[5]$ to send ACK/NACK information in the second timeslot, and UE<2> uses the ACK/NACK control channel $CB_2[8]$ to send ACK/NACK information in the second timeslot.

In the third embodiment, as shown in FIG. 6, only the UEs sending ACK/NACK are multiplexed in one resource block, and the normal cyclic prefix is used in the PUCCH, the number of available OCs c is 3, and in the same OC, the allowed cyclic shift interval is $\Delta_{shift}^{PUCCH}=3$, thus the number of UEs multiplexed to simultaneously send ACK/NACK in one resource block is $N=c\times N_{SC}^{RB}/\Delta_{shift}^{PUCCH}=3\times 12/3=12$, UE<i> selects the control channel $CB_1[i]$ in the first timeslot and thus $CB_2[g1(i, c, A)]$ in the second timeslot, $g(i,c,N)=g(i,3,12)=((i+1)\times 3)\bmod(12+1)-1;$ For instance, UE<1> uses the ACK/NACK control channel $CB_2[5]$ to send ACK/NACK information in the second timeslot, and UE<2> uses the ACK/NACK control channel $CB_2[8]$ to send ACK/NACK information in the second timeslot.

In the fourth embodiment, as shown in FIG. 7, only the UEs sending ACK/NACK are multiplexed in one resource block, and the extended cyclic prefix is used in the PUCCH, the number of available OCs c is 2, and in the same OC, the allowed cyclic shift interval is $\Delta_{shift}^{PUCCH}=2$, thus the number of UEs multiplexed to simultaneously send ACK/NACK in one resource block is $N=c\times N_{SC}^{RB}/\Delta_{shift}^{PUCCH}=2\times 12/2=12$, UE<i> selects the control channel $CB_1[i]$ in the first timeslot and thus $CB_2[g1(i, c, N)]$ in the second timeslot, $g(i,c,N)=g(i,2,12)=((i+1)\times 2)\bmod(12+1)-1;$ For instance, UE<1> uses the ACK/NACK control channel $CB_2[3]$ to send ACK/NACK information in the second timeslot, and UE<2> uses the ACK/NACK control channel $CB_2[5]$ to send ACK/NACK information in the second timeslot.

In the fifth embodiment, as shown in FIG. 8, only the UEs sending ACK/NACK are multiplexed in one resource block, and the normal cyclic prefix is used in the PUCCH, the number of available OCs c is 2, and in the same OC, the allowed cyclic shift interval is $\Delta_{shift}^{PUCCH}=3$, thus the number of UEs multiplexed to simultaneously send ACK/NACK in one resource block is $c\times N_{SC}^{RB}/\Delta_{shift}^{PUCCH}=2\times 12/3=8$, UE<i> selects the control channel $CB_1[i]$ in the first timeslot and $CB_2[g1(i, c, N)]$ in the second timeslot, $g(i,c,N)=g(i,2,8)=((i+1)\times 2)\bmod(8+1)-1;$ For instance, UE<1> uses the ACK/NACK control channel $CB_2[3]$ to send ACK/NACK information in the second timeslot, and UE<2> uses the ACK/NACK control channel $CB_2[5]$ to send ACK/NACK information in the second timeslot.

In the sixth embodiment, as shown in FIG. 9, only the UEs sending CQI are multiplexed in one resource block, the number of cyclic shifts of the available CAZAC sequence that can be used by the CQI control channel is N=12; c' is a natural number prime with N+1 (that is, 13); c' is 3 in the case shown in FIG. 9, and UE<i> selects the control channel CS=i in the first timeslot and CS=g(i, c', N) in the second timeslot, $g(i,c',N)=g(i,3,12)=((i+1)\times 3)\bmod(12+1)-1$ In the seventh embodiment, as shown in FIG. 10, only the UEs sending CQI are multiplexed in one resource block, the number of cyclic shifts of the available CAZAC sequence used by the CQI control channel is N=12; c' is a natural number prime with N+1 (that is, 13); c' is 12 in the case shown in FIG. 10, and UE<i> selects the control channel CS=i in the first timeslot and CS=g(i, c', N) in the second timeslot, $g(i,c',N)=g(i,12,12)=((i+1)\times 12)\bmod(12+1)-1$ As shown in FIG. 10, the CS used by the UEs in the first timeslot and that used in the second timeslot has the imaging effect, thus their implementation is simple.

In the eighth embodiment, as shown in FIG. 11, both the UEs sending ACK/NACK and those sending CQI are multiplexed in one resource block, and the number of available OCs is 3 when the normal cyclic prefix is used in the PUCCH, the number of cyclic shifts allocated to the UEs sending the ACK/NACK is $N_{CS}^{(1)}=6$, and in the same OC, the allowed cyclic shift interval is $\Delta_{shift}^{PUCCH}=1$, thus the number of UEs multiplexed to simultaneously send ACK/NACK in one resource block is $N=c\times N_{CS}^{(1)}/\Delta_{shift}^{PUCCH}=3\times 6/1=18$, UE<i> selects the control channel $CB_1[i]$ to send the ACK/NACK in the first timeslot and is to select $CB_2[g1(i, c, N)]$ to send the ACK/NACK in the second timeslot, $$g1(i,c,N)=g1(i,3,18)=((i+1)\times 3)\bmod(18+1)-1$$

For the UEs sending the CQI, since the number of cyclic shifts used by them is $N_{CS}^{(2)}=N_{CS}^{RB}-2-N_{CS}^{(1)}=4$, UE<j> selects CS=j as the control channel to send CQI in the first timeslot and is to select CS=$g2(j,c',N_{CS}^{(2)})$ as the control channel to send CQI in the second timeslot, c' is 4 in the case shown in FIG. 11, $$g2(j,c',N_{CS}^{(2)})=g2(j,4,4)=((j+1)\times 4)\bmod(4+1)-1$$

In the ninth embodiment, as shown in FIG. 12, both the UEs sending ACK/NACK and those sending CQI are multiplexed in one resource block, and the number of available OCs c is 3 when the normal cyclic prefix is used in the PUCCH, the number of cyclic shifts allocated to the UEs sending the ACK/NACK is $N_{CS}^{(1)}=6$, and in the same OC, the allowed cyclic shift interval is $\Delta_{shift}^{PUCCH}=2$, thus the number of UEs multiplexed to simultaneously send ACK/NACK in one resource block is $N=c\times N_{CS}^{(1)}/\Delta_{shift}^{PUCCH}=3\times 6/2=9$, UE<i> selects the control channel $CB_1[i]$ to send the ACK/NACK in the first timeslot and is to select $CB_2[g1(i, c, N)]$ to send the ACK/NACK in the second timeslot, $$g1(i,c,N)=g1(i,3,9)=((i+1)\times 3)\bmod(9+1)-1$$

For the UEs sending the CQI, since the number of cyclic shifts used by them is $N_{CS}^{(2)}=N_{CS}^{RB}-2N_{CS}^{(1)}=4$, thus UE<j> selects CS=j as the control channel to send the CQI in the first timeslot and is to select CS=$g2(j,c',N_{CS}^{(2)})$ as the control channel to send the CQI in the second timeslot, c' is 4 in the case shown in FIG. 11, $$g2(j,c',N_{CS}^{(2)})=g2(j,4,4)=((j+1)\times 4)\bmod(4+1)-1$$

In the tenth embodiment, as shown in FIG. 13, both the UEs sending ACK/NACK and those sending CQI are multiplexed in one resource block, and the number of available OCs c is 3 when the normal cyclic prefix is used in the PUCCH, the number of cyclic shifts allocated to the UEs sending the ACK/NACK is $N_{CS}^{(1)}=6$, and in the same OC, the allowed cyclic shift interval is $\Delta_{shift}^{PUCCH}=3$, thus the number of UEs multiplexed to simultaneously send ACK/NACK in one resource block is $N=c\times N_{CS}^{(1)}/\Delta_{shift}^{PUCCH}=3\times 6/3=6$, UE<i> selects the control channel $CB_1[i]$ to send the ACK/NACK in the first timeslot and is to select $CB_2[g1(i, c, N)]$ to send the ACK/NACK in the second timeslot, $$g1(i,c,N)=g1(i,3,6)=((i+1)\times 3)\bmod(6+1)-1$$

For the UEs sending the CQI, since the number of cyclic shifts used by them is $N_{CS}^{(2)}=N_{CS}^{RB}-2-N_{CS}^{(1)}=4$, UE<j> selects CS=j as the control channel to send CQI in the first timeslot and is to select CS=$g2(j,c',N_{CS}^{(2)})$ as the control channel to send CQI in the second timeslot, c' is 4 in the case shown in FIG. 11, $$g2(j,c',N_{CS}^{(2)})=g2(j,4,4)=((j+1)\times 4)\bmod(4+1)-1$$

In the eleventh embodiment, as shown in FIG. 14, both the UEs sending ACK/NACK and those sending CQI are multiplexed in one resource block, and the number of available OCs c is 2 when the extended cyclic prefix is used in the PUCCH, the number of cyclic shifts allocated to the UEs sending the ACK/NACK is $N_{CS}^{(1)}=6$, and in the same OC, the allowed cyclic shift interval is $\Delta_{shift}^{PUCCH}=2$, thus the number of UEs multiplexed to simultaneously send ACK/NACK in one resource block is $N=c\times N_{CS}^{(1)}/\Delta_{shift}^{PUCCH}=2\times 6/2=6$, UE<i> selects the control channel $CB_1[i]$ to send ACK/NACK in the first timeslot and is to select $CB_2[g1(i, c, N)]$ to send ACK/NACK in the second timeslot, $$g1(i,c,N)=g1(i,2,6)=((i+1)\times 2)\bmod(6+1)-1$$

For the UEs sending the CQI, since the number of cyclic shifts used by them is $N_{CS}^{(2)}=N_{CS}^{RB}-2-N_{CS}^{(1)}=4$, thus UE<j> selects CS=j as the control channel to send CQI in the first timeslot and is to select CS=$g2(j,c',N_{CS}^{(2)})$ as the control channel to send CQI in the second timeslot, c' is 4 in the case shown in FIG. 11, $$g2(j,c',N_{CB}^{(2)})=g2(j,4,4)=((j+1)\times 4)\bmod(4+1)-1$$

In the twelfth embodiment, as shown in FIG. 15, both the UEs sending ACK/NACK and those sending CQI are multiplexed in one resource block, and the number of available OCs c is 2 when the extended cyclic prefix is used in the PUCCH, the number of cyclic shifts allocated to the UEs sending the ACK/NACK is $N_{CS}^{(1)}=6$, and in the same OC, the allowed cyclic shift interval is $\Delta_{shift}^{PUCCH}=3$, thus the number of UEs multiplexed to simultaneously send ACK/NACK in one resource block is $N=c\times N_{CS}^{(1)}/\Delta_{shift}^{PUCCH}=2\times 6/3=4$, UE<i> selects the control channel $CB_1[i]$ to send the ACK/NACK in the first timeslot and is to select $CB_2[g1(i, c, N)]$ to send the ACK/NACK in the second timeslot, $$g1(i,c,N)=g1(i,2,4)=((i+1)\times 2)\bmod(4+1)-1$$

For the UEs sending the CQI, since the number of cyclic shifts used by them is $N_{CS}^{(2)}=N_{CS}^{RB}-2-N_{CS}^{(1)}=4$, thus UE<j> selects CS=j as the control channel to send CQI in the first timeslot and is to select CS=$g2(j,c',N_{CS}^{(2)})$ as the control channel to send CQI in the second timeslot, c' is 4 in the case shown in FIG. 11, $$g2(j,c',N_{CS}^{(2)})=g2(j,4,4)=((j+1)\times 4)\bmod(4+1)-1$$

From the above description, it can be seen that for the remapping methods in the three cases, the basic principle is the same and they all apply the Prime-Modulo method, thus having advantages of uniform form and simple implementation.

Those skilled in the art should understand that the above description is only preferred embodiments of the present invention, and they are not intended to limit the scope of the present invention; all the equal modifications and variations according to the present invention should belong to the scope of the present invention.

INDUSTRIAL APPLICABILITY

With the method of the present invention, it can guarantee to make the interference among the UEs multiplexed in one resource block or a hybrid resource block is equalized and randomized in the sustained period of control channel, thus to achieve the interference randomization of the PUCCH of each UE in the cell and improve the receipt performance of the PUCCH.

What we claim is:
1. A method for interference randomization in a physical uplink control channel, comprising:
    sending uplink control signalings in first and second timeslots of a sub-frame with different physical uplink control channel resources when a plurality of user equipments are multiplexed in the physical uplink control channel;
    wherein difference of indexes of control channel resources used by any two user equipments in the first timeslot of the physical uplink control channel is different from that of indexes of control channel resources used by the two user equipments in the second timeslot.

2. A method of claim 1, wherein,
said physical uplink control channels only multiplexing the user equipments sending acknowledgement/non-acknowledgement messages, and when said user equipments send the acknowledgement/non-acknowledgement messages in the physical uplink control channels in the first and second timeslots of the sub-frame, orthogonal codes in time domain in use are the same while cyclic shifts of a constant amplitude zero auto correlation sequence are different, or the orthogonal codes in time domain in use are different while the cyclic shifts of the constant amplitude zero auto correlation sequence are the same, or both the orthogonal codes in time domain in use and the cyclic shifts of the constant amplitude zero auto correlation sequence are different.

3. A method of claim 2, wherein,
said user equipments sending the acknowledgement/non-acknowledgement messages in the control channel with a control channel resource index of i in the first timeslot and in the control channel with a control channel resource index of g(i, d, N) in the second timeslot, and the number of control channels provided for the user equipments sending the acknowledgement/non-acknowledgement messages in the first and second timeslots are N respectively and order thereof is the same, where, $0 \leq i \leq N-1$, $$g(i,d,N)=((i+1) \times d) \bmod (N+1)-1$$

the value of N is $c \times N_{SC}^{RB}/\Delta_{shift}^{PUCCH}$, where,
c is the number of the orthogonal codes in time domain, and c is 3 when said physical uplink control channel uses a normal cyclic prefix and c is 2 when said physical uplink control channel uses an extended cyclic prefix;
$N_{SC}^{RB}$ is the number of sub-carriers occupied by a resource block in which said control channel is located;
$\Delta_{shift}^{PUCCH}$ is interval of the cyclic shifts of the constant amplitude zero auto correlation sequence in the same orthogonal code in time domain;
d is a natural number prime with N+1;
mod denotes modulo operation.

4. A method of claim 1, wherein,
said physical uplink controls channel only multiplexing the user equipments sending channel quality indicators, and when said user equipments send the channel quality indicators in the physical uplink control channels in the first and second timeslots of the sub-frame, cyclic shifts of a constant amplitude zero auto correlation sequence in use are different.

5. A method of claim 4, wherein,
said user equipments sending the channel quality indicators in the control channel with a control channel resource index of i in the first timeslot, and send the channel quality indicators in the control channel with a control channel resource index of g(i, c', N) in the second timeslot, and the number of the control channels for the user equipments sending the channel quality indicators in the first and second timeslots is N respectively and order thereof is the same, where, $0 \leq i \leq N-1$, $$g(i,c',N)=((i+1) \times c') \bmod (N+1)-1$$

Where, N is the number of the cyclic shifts of the constant amplitude zero auto correlation sequence, that is, $N=N_{SC}^{RB}$, where $N_{SC}^{RB}$ is the number of sub-carriers occupied by a resource block in which said control channels are located; c' is a natural number prime with N+1; mod denotes modulo operation.

6. A method of claim 1, wherein,
said physical uplink control channels multiplexing both the user equipments sending acknowledgement/non-acknowledgement messages and the user equipments sending channel quality indicators, wherein, when said user equipments send the acknowledgement/non-acknowledgement messages in the physical uplink control channels in the first and second timeslots of a sub-frame, orthogonal codes in time domain in use are the same while cyclic shifts of a constant amplitude zero auto correlation sequence are different, or the orthogonal codes in time domain in use are different while the cyclic shifts of the constant amplitude zero auto correlation sequence are the same, or both the orthogonal codes in time domain in use and the cyclic shifts of the constant amplitude zero auto correlation sequence are different; when said user equipments send channel quality indicators in the physical uplink control channels in the first and second timeslots of the sub-frame, cyclic shifts of a constant amplitude zero auto correlation sequence are different.

7. A method of claim 6, wherein,
the number of the cyclic shifts of the constant amplitude zero auto correlation sequence sending the acknowledgement/non-acknowledgement messages is $N_{SC}^{(1)}$, while that of the cyclic shifts of the constant amplitude zero auto correlation sequence sending the channel quality indicators is $N_{CS}^{(2)}$;
said user equipments sending the acknowledgement/non-acknowledgement messages send the acknowledgement/non-acknowledgement messages in a control channel with a control channel resource index i in the first timeslot, and in the control channel with a control channel resource index of g1(i, d, N) in the second timeslot, and the number of the control channels for the user equipments sending the acknowledgement/non-acknowledgement messages in the first and second timeslots is N respectively and order thereof is the same, $0 \leq i \leq N-1$, where, $$g(i,d,N)=((i+1) \times d) \bmod (N+1)-1$$

the value of N is $c \times N_{SC}^{(1)}/\Delta_{shift}^{PUCCH}$, where, $\Delta_{shift}^{PUCCH}$ is interval of the cyclic shifts of the constant amplitude zero auto correlation sequence in the same orthogonal code in time domain; c is the number of orthogonal codes in time domain, and c is 3 when said physical uplink control channel uses a normal cyclic prefix and c is 2 when said physical uplink control channel uses an extended cyclic prefix; d is a natural number prime with N+1; mod denotes modulo operation;
said user equipments sending the channel quality indicators send the channel quality indicators in the control channel with a control channel resource index j in the first timeslot and send the channel quality indicators in the control channels with a control channel resource index of g2(j,c',$N_{CS}^{(2)}$) in the second timeslot, and the number of control channels for the user equipments sending the channel quality indicators in the first and second timeslots is $N_{CS}^{(2)}$ respectively and order thereof is the same, $0 \leq j \leq N_{CS}^{(2)}-1$, where, $$g2(j,c',N_{CS}^{(2)})=((j+1)*c') \bmod (N_{CS}^{(2)}+1)-1$$

c' is a natural number prime with $N_{CS}^{(2)}+1$; mod denotes modulo operation.

8. A method of claim 7, wherein, $N_{CS}^{(2)}=N_{CS}^{RB}-2-N_{CS}^{(1)}$, and $N_S^{RB}$ is the number of sub-carriers occupied by a resource block in which said control channels are located.

9. A method of claim 3, wherein, the value of d is the number of orthogonal codes in time domain, that is, d=c.

10. A method of claim 5, wherein, the value of c' is the number of the cyclic shifts of the constant amplitude zero auto correlation sequence for sending the channel quality indicators in the control channels, that is, $c'=N_{CS}^{RB}$ or $c'=N_{CS}^{(2)}$.

11. A method for interference randomization in a physical uplink control channel, applied in long term evolution system, comprising:
    user equipments sending acknowledgement/non-acknowledgement messages in a control channel with a control channel resource index of i in the first timeslot and in a control channel with a control channel resource index of g(i, d, N) in the second timeslot, and $$g(i,d,N)=((i+1)\times d)\bmod(N+1)-1$$

in the equation, $0 \leq i \leq N-1$, $N=c \times N_{SC}^{RB}/\Delta_{shift}^{PUCCH}$, where, c is the number of orthogonal codes in time domain, $N_{SC}^{RB}$ is the number of sub-carriers occupied by one resource block; $\Delta_{shift}^{PUCCH}$ is interval of cyclic shifts of a constant amplitude zero auto correlation sequence in the same orthogonal code in time domain; d is a natural number prime with N+1; mod denotes modulo operation.

12. A method of claim 11, wherein,
    c is 3 when said physical uplink control channel uses a normal cyclic prefix, and c is 2 and d=c when said physical uplink control channel uses an extended cyclic prefix.

13. A method of claim 7, wherein, the value of d is the number of orthogonal codes in time domain, that is, d=c.

14. A method of claim 7, wherein, the value of c' is the number of the cyclic shifts of the constant amplitude zero auto correlation sequence for sending the channel quality indicators in the control channels, that is, $c'=N_{SC}^{RB}$ or $c'=N_{CS}^{(2)}$.

* * * * *

UNITED STATES PATENT AND TRADEMARK OFFICE
CERTIFICATE OF CORRECTION

PATENT NO. : 8,594,017 B2
APPLICATION NO. : 12/988584
DATED : November 26, 2013
INVENTOR(S) : Shuqiang Xia et al.

It is certified that error appears in the above-identified patent and that said Letters Patent is hereby corrected as shown below:

In the Claims:

Column 14, Line 27, Claim 7:

After "non-acknowledgement messages is"
Delete " $N_{sc}^{(1)}$," and
Insert -- $N_{CS}^{(1)}$, --.

Column 14, Line 45, Claim 7:

After "the value of $N$ is"
Delete " $c \times N_{sc}^{(1)} / \Delta_{shift}^{PUCCH}$," and
Insert -- $c \times N_{CS}^{(1)} / \Delta_{shift}^{PUCCH}$ --.

Column 15, Line 2, Claim 8:

After "A method of claim 7, wherein"
Delete " $N_{cs}^{(2)} = N_{cs}^{RB} - 2 - N_{cs}^{(1)}$ and $N_{s}^{RB}$," and
Insert -- $N_{CS}^{(2)} = N_{sc}^{RB} - 2 - N_{CS}^{(1)}$, and $N_{sc}^{RB}$ --.

Column 15, Line 10, Claim 10:

After "in the control channels, that is"
Delete " $c' = N_{cs}^{RB}$ or $c' = N_{cs}^{(2)}$," and
Insert -- $c' = N_{sc}^{RB}$ or $c' = N_{cs}^{(2)}$ --.

Signed and Sealed this
Twenty-fifth Day of March, 2014

Michelle K. Lee
*Deputy Director of the United States Patent and Trademark Office*